United States Patent [19]

Maitenaz

[11] Patent Number: 4,778,266
[45] Date of Patent: Oct. 18, 1988

[54] PROGRESSIVE MULTIFOCAL OPHTHALMIC LENS

[75] Inventor: Bernard Maitenaz, la Varenne Saint Hilaire, France

[73] Assignee: Essilor International Cie Generale d'Optique, Creteil, France

[21] Appl. No.: 916,806

[22] Filed: Oct. 8, 1986

[30] Foreign Application Priority Data

Oct. 16, 1985 [FR] France .................. 85 15322

[51] Int. Cl.$^4$ ............................... G02C 7/06
[52] U.S. Cl. ................................. 351/169; 351/168
[58] Field of Search .................. 351/189, 168, 159

[56] References Cited

U.S. PATENT DOCUMENTS 3,785,724  1/1974  Maitenaz .................. 351/169
4,580,883  4/1986  Shinohara ................. 351/169

FOREIGN PATENT DOCUMENTS 1509090  1/1968  France .
2495789  6/1982  France .
2533708  3/1984  France .
2020847  11/1979  United Kingdom .
2058391  4/1981  United Kingdom .
2130391  5/1984  United Kingdom .
2162964  2/1986  United Kingdom .

Primary Examiner—John K. Corbin
Assistant Examiner—Ronald M. Kachmarik
Attorney, Agent, or Firm—Charles E. Brown; Charles A. Brown

[57] ABSTRACT

A progressive multifocal ophthalmic lens has a main meridian along at least part of which the curvature of the lens varies continuously. On each side of the main meridian the areas of aberration are symmetrical to each other. The main meridian intersects a horizontal plane through the optical center of the lens at a point which, relative to a vertical plane passing through the optical center, is spherically offset towards the nose. This offset is between 0.8 and 1.33 millimeters. The plane containing the main meridian is at an angle between 5.5 degrees and 7.5 degrees to the vertical plane. The main meridian converges towards the nose in the lower part of the lens.

1 Claim, 1 Drawing Sheet

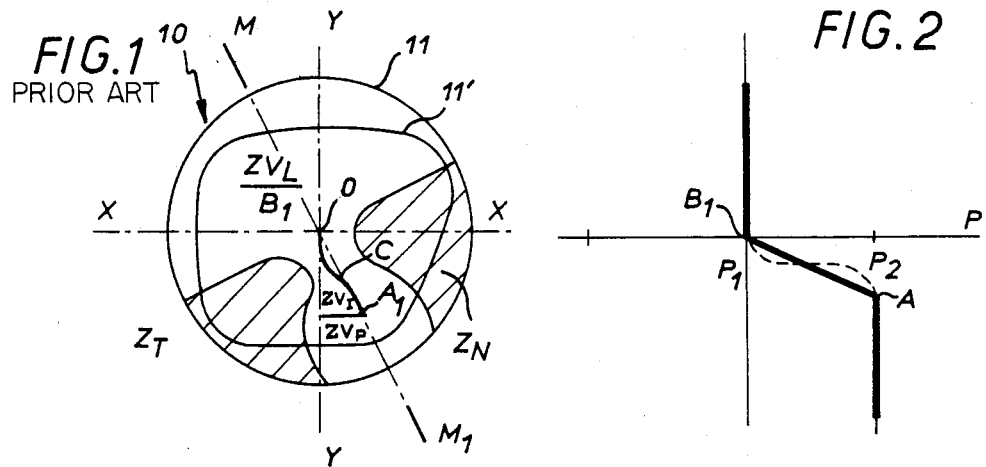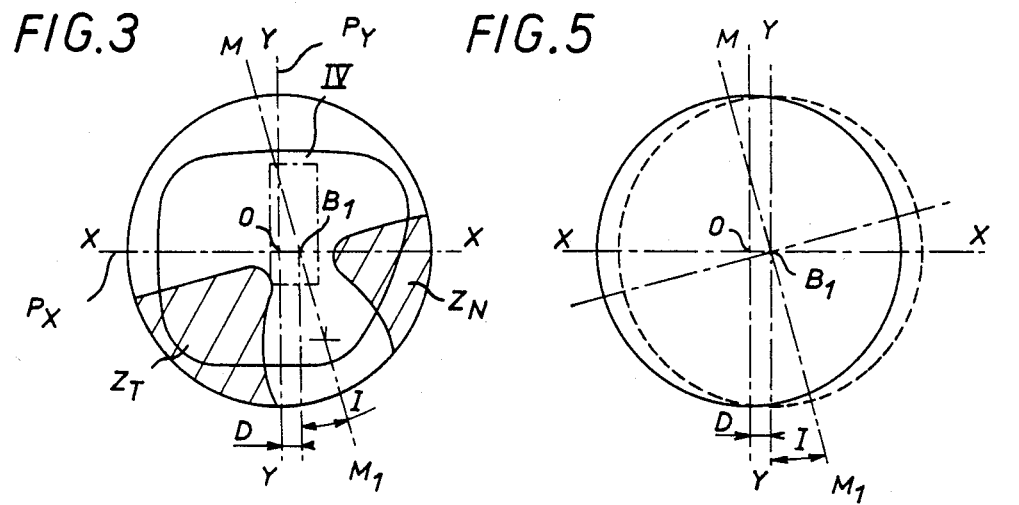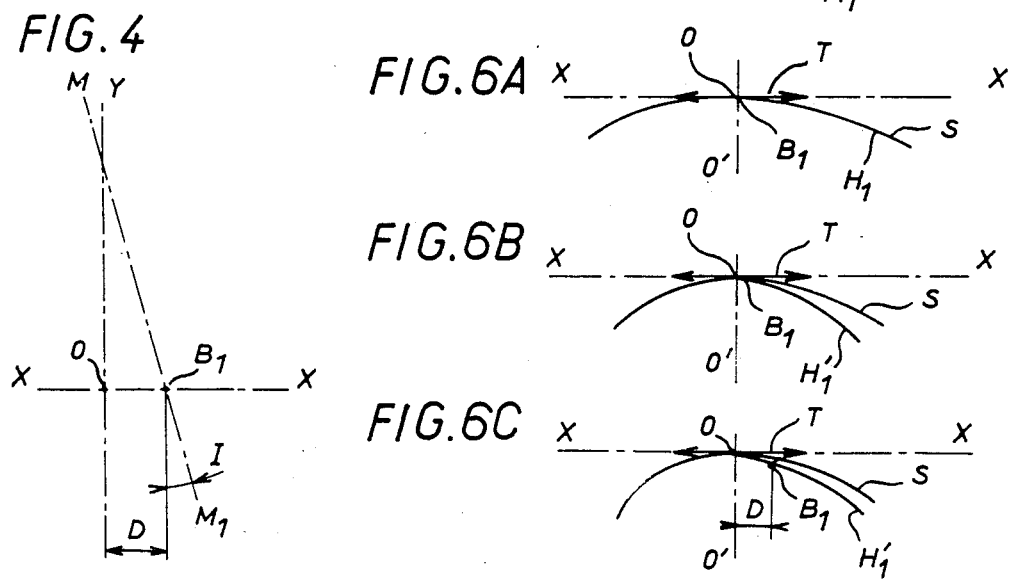

PROGRESSIVE MULTIFOCAL OPHTHALMIC LENS

BACKGROUND OF THE INVENTION

1. Field of the Invention

The present invention is generally concerned with progressive multifocal ophthalmic lenses, meaning ophthalmic lenses in which the surface of one side (in practise usually that of the front side only) comprises an area in which the curvature varies progressively and continuously.

The invention is more particularly (but not exclusively) directed to what is in practise the most usual case, where this progressively variable curvature area lies between two constant curvature (and therefore part-spherical) areas of which one corresponds to the far vision area and the other corresponds to the near vision area.

2. Description of the Prior Art

As is known, the surface of a progressive multifocal ophthalmic lens which features in this way an area of progressively variable curvature, or progressive surface, is established point by point with reference to a spherical surface or reference spherical surface, each of its points being defined by an offset relative to the corresponding point on a reference spherical surface of this kind.

As is also known, a progressive surface of this kind is generally symmetrical to each side of a meridian line, hereinafter referred to for convenience as the main meridian, and it is only along this meridian and in a more or less extensive area to either side of it that the continuous variation of curvature may be obtained in a relatively strict manner without distortion of the images observed, although to either side of this main meridian there are lateral areas of aberration in which the images observed are more or less severely distorted.

From this point of view a progressive multifocal ophthalmic lens may be defined as one comprising a main meridian along at least part of which the curvature varies continuously and on either side of which the areas of aberration are symmetrical to each other.

In what follows, and for reasons of simplicity, the term "ophthalmic lens" will be used interchangeably for both the original blank, which has a circular contour, and the ophthalmic lens proper which is machined from a blank of this kind, its contour then reflecting that of the ring or surround of the eyeglass frame to which it is to be fitted.

Thus, from this point of view, the optical center of an ophthalmic lens is coincident with the geometrical center of the blank from which it is obtained.

It is known that on changing from far vision to near vision the eyes of a person converge so that the line of sight moves closer to the nose.

There have already been various proposals to obtain an acceptable degree of visual comfort for intermediate vision and near vision allowing for the gradual shifting towards the nose of the corresponding line of sight.

These provisions are summarized in French Pat. No. 1.509.090 of Nov. 29, 1966.

One of them involves turning the lens around its optical axis so that the main meridian passes both through the optical center of the lens and substantially through the point where the surface of the lens intersects the line of sight of the subject for near vision, as if, relative to the reference spherical surface, the progressive surface concerned were turned in its entirety through the corresponding angle about the optical center of the lens.

Although this arrangement proves satisfactory for intermediate vision, there results on the nose side a non-negligible incursion of the corresponding aberration area into the area of far vision, to the detriment of the extent of this.

Another known provision consists in offsetting the main meridian laterally towards the nose, to place it at a distance from the vertical line through the optical center of the lens chosen in practise so as to correspond to half the distance to this vertical line from the point where the surface of the lens intersects the line of sight of the subject for near vision, as if, relative to the reference spherical surface, the progressive surface concerned were itself offset as a whole by this amount relative to this vertical line.

Although this arrangement respects the integrity of the far vision area, it is hardly satisfactory for the intermediate vision area or for the near vision area, the line of sight of the subject never being equidistant from the lateral aberration areas or being so only at more or less one point, to the detriment of the required visual comfort.

The other proposals already put forward for improving visual comfort, especially that which is the subject of the French Pat. No. 1.509.090 mentioned hereinabove, although they have proven and may yet prove satisfactory, have the disadvantage of being relatively complex to implement.

A general objective of the present invention is an arrangement which provides a very simple way of procuring the required visual comfort.

SUMMARY OF THE INVENTION

The present invention consists in a progressive multifocal ophthalmic lens comprising a main meridian along at least part of which the curvature of the lens varies continuously and on each side of which the areas of aberration are symmetrical to each other, in which lens the main meridian intersects a horizontal plane through the optical center of the lens at a point which, relative to a vertical plane passing through the optical center, is offset towards the nose by between 0.8 and 1.33 millimeters, the plane containing said main meridian is at an angle between 5.5 degrees and 7.5 degrees to the aforementioned vertical plane, and the main meridian converges towards the nose in the lower part of the lens.

In other words, it is as if, relative to the reference spherical surface, the progressive surface of the lens were subject both to a rotation about its optical axis and a lateral spherical sliding motion along its horizontal cross-section passing through the optical center, away from the optical center and towards the nose.

By virtue of a combination such as this of a simple rotation and a simple lateral spherical sliding motion, a satisfactory degree of visual comfort can be achieved for intermediate vision and for near vision, without there resulting any excessive reduction of the area of far vision.

Furthermore, experience shows that the magnitudes of the lateral sliding and rotation thus applied to the main meridian can advantageously satisfy to a very great extent the majority of situations encountered, if not all of them.

The characteristics and advantages of the invention will emerge from the following description given by way of example with reference to the accompanying schematic drawings.

BRIEF DESCRIPTION OF THE DRAWINGS

FIG. 1 is a view in elevation of a prior art progressive multifocal ophthalmic lens adapted to fit the lefthand ring of an eyeglass frame, as seen from the point of view of the subject concerned.

FIG. 2 is a diagram illustrating the variation of power along the main meridian of an opthalmic lens of this kind.

FIG. 3 is a view in elevation analogous to that of FIG. 1 for a progressive multifocal ophthalmic lens in accordance with the invention.

FIG. 4 shows to a larger scale the detail of FIG. 3 marked by a box IV in FIG. 3.

FIG. 5 is a view corresponding to that of FIG. 3 and shows to what the arrangement which is the subject of the present invention corresponds.

FIGS. 6A through 6C are cross-sections on the horizontal plane PX in FIG. 3 schematically showing the process yielding a progressive multifocal ophthalmic lens in accordance with the invention.

DESCRIPTION OF THE PREFERRED EMBODIMENT

FIG. 1 is a view in elevation of a prior art ophthalmic lens 10.

As stated above, the term "ophthalmic lens" is used here to designate, as shown in thicker line, the circular contoured blank 11 and also, as shown in thinner line, the ophthalmic lens proper 11', the contour of which corresponds to that of the ring of the eyeglass frame to which it is to be fitted, obtained by machining the blank 11.

The lens 10 is shown in the mounted position corresponding to the left eye of a subject.

The lens 10 has an optical center O which in the example shown is coincident with the geometrical center of the circular contour blank 11 and which may be regarded as constituting the summit of the ophthalmic lens in quesion, or the point where its convex front surface intersects its optical axis.

In the usual way the rear face of the lens 10 is formed by a surface of revolution, a spherical surface, for example.

On the other hand, its front surface is a progressive surface, meaning one which, although continuous, features an area in which the curvature varies progressively.

XX is the horizontal line passing through the optical center O and YY is a corresponding vertical line.

It is known that the line of sight or visual axis of a subject moves away from the vertical YY and nearer the nose when the eyes change from far vision to near vision.

FIG. 1 shows in full line and in an accentuated way the trajectory B1 A1 of the visual axis on the lens when the left eye of the subject looks from a point at infinity (far vision) to a point situated at a distance of approximately 30 centimeters, corresponding to near vision.

To take into account this trajectory B1 A1 it is known in the case of progressive ophthalmic lenses with surfaces symmetrical relative to the mean progression meridian to turn the lens about its optical axis OO' passing through O by an angle such that the main progression meridian MM1 passes through the end points B1 and A1 of the trajectory of the visual axis on the lens.

FIG. 1 shows the various vision areas and FIG. 2 is a diagram showing the variation of power along the main meridian MM1.

The upper area ZVL of power P1 is reserved for far vision and the lower area ZVP of power P2 is reserved for near vision.

Between these two areas in the area ZVI of intermediate vision the power of which varies along MM1 from P1 to P2.

The progressive surface is affected laterally by aberration areas ZT and ZN disposed one on the temple side and the other on the nose side and symmetrical to each other on either side of the main meridian MM1.

The aberration areas ZT, ZN are shaded in the figures.

As a result of this, when the lens is turned as shown here about its optical axis until the main meridian passes through the optical center of the lens and substantially through the point where the lens surface intersects the line of sight of the subject for near vision, the upper part ZVL situated above the horizontal line XX and adapted to far vision is affected by extremely bothersome aberrations on the nose side.

From the visual point of view this causes the subject discomfort.

In the progressive multifocal ophthalmic lens in accordance with the invention (FIG. 3) the progressive surface is subject both to a rotation about its optical axis and a lateral spherical sliding motion along its horizontal cross-section shown by the line XX in FIGS. 3 through 5.

In accordance with the invention, and in combination, the main meridian MM1 intersects the horizontal plane PX passing through the optical center O of the lens at a point B1 which, relative to the vertical plane PY passing through O, is offset towards the nose by an amount D between 0.8 and 1.3 millimeters, and the plane containing the main meridian MM1 is at an angle I to the vertical plane YY between 5.5 degrees and 7.5 degrees, the main meridian converging towards the nose in the lower part of the lens.

As shown by FIGS. 3 through 6, it is as if, relative to the reference spherical surface S, the progressive surface were turned about its optical axis O' through an angle I and then subject to a lateral spherical sliding motion towards the nose until the point B1 on the main meridian MM1 is at a distance B from the optical axis OO' of the lens.

FIGS. 6A and 6C facilitate a better understanding of the combination of the two operations applied, showing the two operations schematically.

To simplify the explanation they will be described in the order rotation then lateral spherical sliding.

It is to be understood that the order is immaterial and that the two operations could just as well be effected simultaneously.

FIG. 6A is a cross-section on the horizontal plane PX passing through the optical center O of a symmetrical progressive surface for which the plane containing the main meridian MM1 is coincident with the vertical plane PX. In this case B1 is coincident with O. T is the horizontal tangent to the reference spherical surface S and to the progressive surface of section H1.

FIG. 6B is a cross-section analogous to FIG. 6A but after rotation of the progressive surface about the optical axis OO' by an angle I.

H'1 is the cross-section of the progressive surface on the plane PX.

FIG. 6C shows the lateral spherical sliding motion of the progressive surface towards the nose.

The progressive surface is caused to slide by a translation and rotation movement such that the point B1 on the main meridian MM1 lies at a distance D from the optical axis OO' and the horizontal section H'1 of the progressive surface remains tangential to the horizontal tangent T at O.

In practise, these operations result from simple calculations: firstly, in the usual way, the offsets between the various points of the progressive surface required and the corresponding points on the reference spherical surface are calculated; calculations are then carried out to convert these offsets into final offset dimensions given the rotation and the lateral spherical sliding motion to be applied to the progressive surface.

There is obtained in this way the progressive multifocal ophthalmic lens in accordance with the invention shown in FIGS. 3 through 5 in which MM1 substantially represents the position of the main meridian projected onto the plane XOY, the plane containing said meridian MM1 lying, because of this lateral spherical sliding, at an angle to the plane XOY which is not exactly equal to but very close to 90 degrees.

The invention procures distinct lefthand and righthand lenses with which it is possible to achieve a satisfactory degree of visual comfort for both intermediate and near vision.

It is to be understood that the present invention is not limited to the embodiment described and shown but encompasses any variant execution thereof.

There is claimed:

1. Progressive multifocal ophthalmic lens comprising a main meridian along at least part of which the curvature of the lens varies continuously and on each side of which the areas of aberration are symmetrical to each other, in which lens the main meridian intersects a horizontal plane through the optical center of the lens at a point which, relative to a vertical plane passing through the optical center, is spherically offset towards the nose by between 0.8 and 1.33 millimeters, the plane containing said main meridian is at an angle between 5.5 degrees and 7.5 degrees to the aforementioned vertical plane, and the main meridian converges towards the nose in the lower part of the lens.

* * * * *